(12) United States Patent
Gong et al.

(10) Patent No.: US 8,109,486 B2
(45) Date of Patent: Feb. 7, 2012

(54) CHASSIS WITH RUBBER PADS

(75) Inventors: Bin Gong, Shenzhen (CN);
Ming-Chang Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 140 days.

(21) Appl. No.: 12/631,849

(22) Filed: Dec. 6, 2009

(65) Prior Publication Data
US 2011/0089299 A1    Apr. 21, 2011

(30) Foreign Application Priority Data
Oct. 16, 2009  (CN) .......................... 2009 1 0308379

(51) Int. Cl.
*F16M 13/00* (2006.01)
(52) U.S. Cl. ... 248/615; 248/633; 248/634; 248/222.11; 248/223.41; 248/220.1; 361/679.02; 361/679.59; 361/679.55; 312/223.2; 312/351.1
(58) Field of Classification Search .............. 248/568, 248/615, 633, 634, 235, 250, 220.1, 345.1; 361/679.59; 312/223.2, 351.1
See application file for complete search history.

(56) References Cited

U.S. PATENT DOCUMENTS

| | | | | |
|---|---|---|---|---|
| 325,696 A * | 9/1885 | Post | ............................... | 108/180 |
| 2,396,381 A * | 3/1946 | Magnenat | ................... | 248/188.9 |
| 3,274,450 A * | 9/1966 | Siebold | .......................... | 361/808 |
| 3,749,465 A * | 7/1973 | Newcomer | ..................... | 312/245 |
| 4,735,391 A * | 4/1988 | Lawrence | ..................... | 248/243 |
| 4,949,929 A * | 8/1990 | Kesselman et al. | ........... | 248/300 |
| 5,486,041 A * | 1/1996 | Sykes | ........................... | 312/111 |
| 5,947,301 A * | 9/1999 | Kunz | .............................. | 211/40 |
| 6,023,800 A * | 2/2000 | Stickley | .......................... | 5/621 |
| 6,105,794 A * | 8/2000 | Bauer | ........................ | 211/94.01 |
| 6,279,861 B1 * | 8/2001 | Nolan | .......................... | 248/188.2 |
| 6,370,022 B1 * | 4/2002 | Hooper et al. | .......... | 361/679.33 |
| 6,496,363 B1 * | 12/2002 | Li | ............................... | 361/679.4 |
| 6,554,236 B2 * | 4/2003 | Marsh | ........................... | 248/235 |
| 6,571,898 B2 * | 6/2003 | Guyomard | ................... | 180/68.4 |
| 6,672,793 B2 * | 1/2004 | Shyr | ............................... | 403/324 |
| 6,769,750 B2 * | 8/2004 | Hughes et al. | ............. | 312/265.5 |
| 6,827,320 B2 * | 12/2004 | Yeh | .......................... | 248/220.22 |
| 7,448,702 B2 * | 11/2008 | Chen et al. | ................ | 312/223.2 |
| 2005/0029909 A1 * | 2/2005 | Kitatani | ..................... | 312/223.2 |
| 2007/0127194 A1 * | 6/2007 | She | ............................... | 361/681 |
| 2008/0174946 A1 * | 7/2008 | Chen et al. | ..................... | 361/683 |

* cited by examiner

*Primary Examiner* — Alfred J Wujciak
*Assistant Examiner* — Michael McDuffie
(74) *Attorney, Agent, or Firm* — Altis Law Group, Inc.

(57) ABSTRACT

A chassis includes a base body and a rubber pad. The base body includes a bottom plate and a side plate perpendicular to the bottom plate. A mounting portion is defined in a junction portion of the bottom plate and the side plate. The rubber pad includes a resisting portion and a clamping portion perpendicularly extending from the resisting portion. The rubber pad is detachably received in the mounting portion, with the resisting portion locking with the side plate and the clamping portion engaging with the bottom plate.

5 Claims, 6 Drawing Sheets

CHASSIS WITH RUBBER PADS

BACKGROUND

1. Technical Field

The disclosure relates to chassis, and particularly to a chassis readily securing a plurality of rubber pads.

2. Description of Related Art

A chassis of an electronic device, such as a notebook computer, is normally made of plastic, or other similar material. Usually, a plurality of rubber pads are adhered to the chassis to reduce vibration and/or increase friction, which is inconvenient for assembling, and can reduce productivity and efficiency of manufacturing. Moreover, the plurality of rubber pads is easily snagged by something and peeled off.

DETAILED DESCRIPTION

Figure 1:
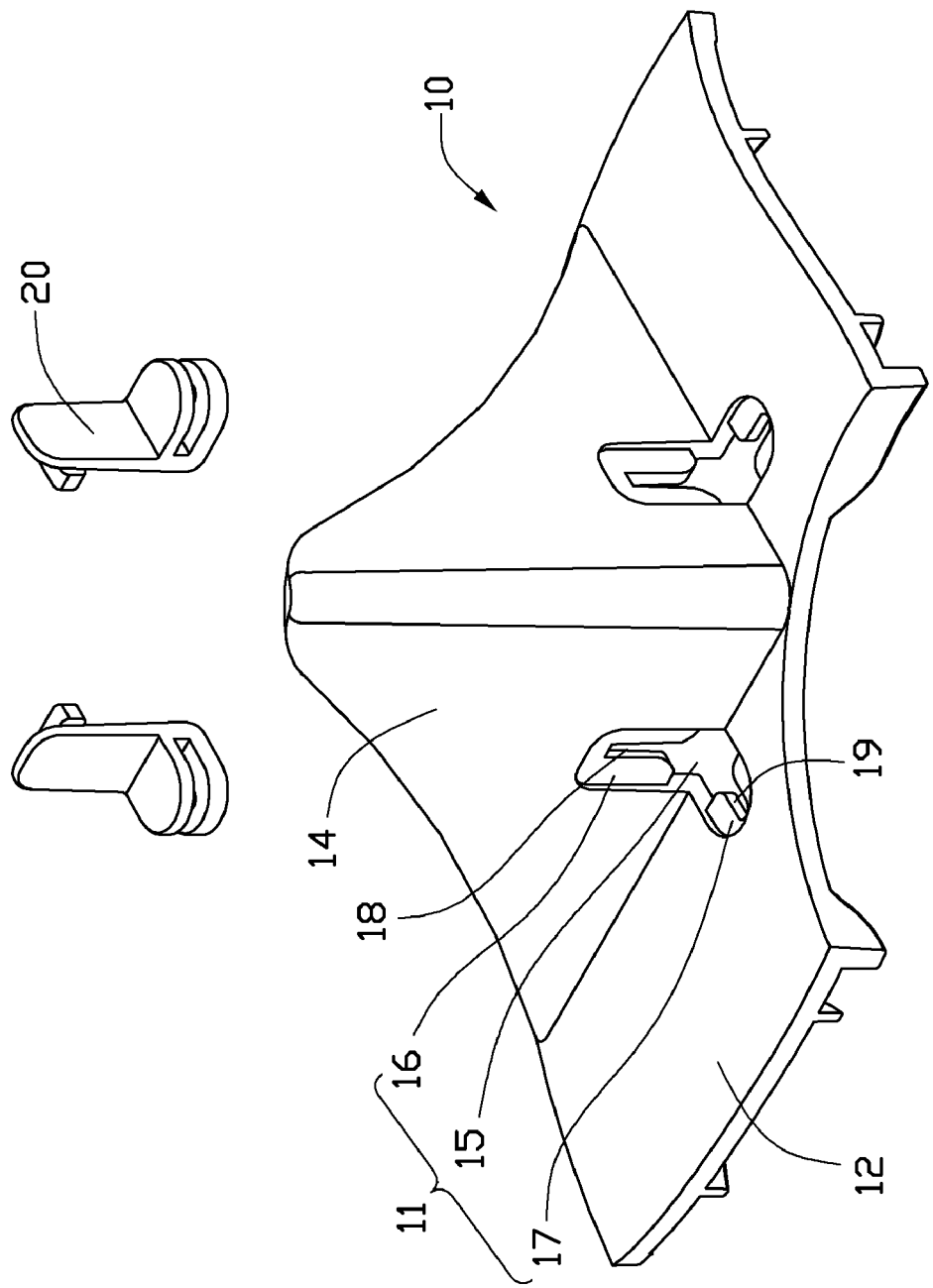
FIG. 1 is an exploded, isometric view of an exemplary embodiment of a chassis, the chassis including a base body and a plurality of rubber pads.
Figure 2:
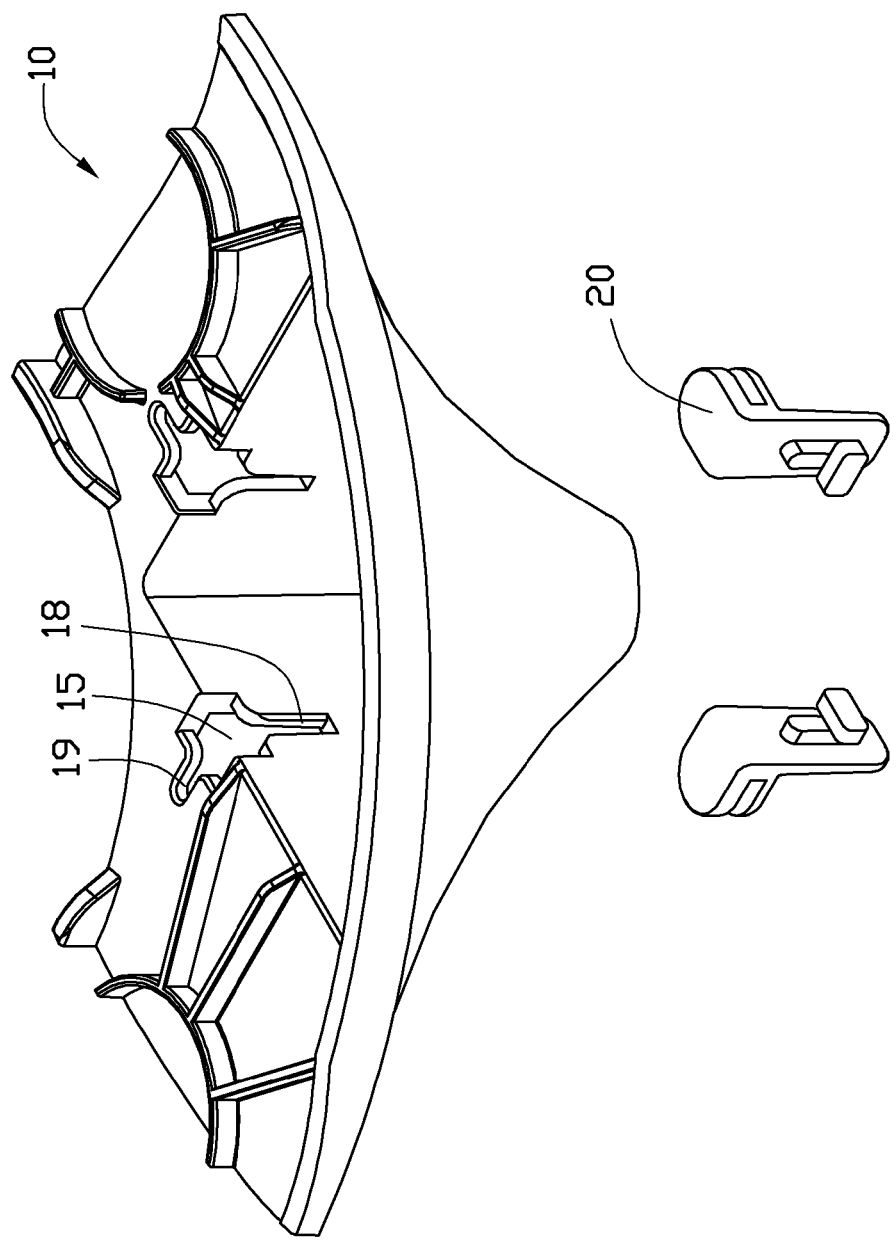
FIG. 2 is an inverted view of the chassis of FIG. 1.

Referring to FIGS. 1 and 2, an exemplary embodiment of a chassis includes a base body 10 and a plurality of rubber pads 20 detachably mounted to the base body 10.

The base body 10 includes a bottom plate 12 and a wavy-shaped side plate 14 perpendicular to the bottom plate 12. The side plate 14 includes a plurality of sides connected to the bottom plate 12. A mounting portion 11 is defined in a junction portion of the bottom plate 12 and each side of the side plate 14. Each mounting portion 11 includes a generally L-shaped through hole 15 situated in the junction portion of the bottom plate 12 and a corresponding side of the side plate 14, a first groove 16 situated in the side plate 14, and a second groove 17 situated in the bottom plate 12. The first and second grooves 16 and 17 are aligned with the through hole 15, and are perpendicular to each other. A locking slot 18 is defined in the first groove 16, communicating with the through hole 15. A through slot 19 is defined in the second groove 17, communicating with the through hole 15 and perpendicular to the locking slot 18.

In another embodiment, the first and second grooves 16 and 17, and the through slot 19 can be omitted.

In another embodiment, the first and second grooves 16 and 17 can be omitted. The locking slot 18 and the through slot 19 can be directly defined in the side plate 14 and the bottom plate 12, respectively.

Figure 3:
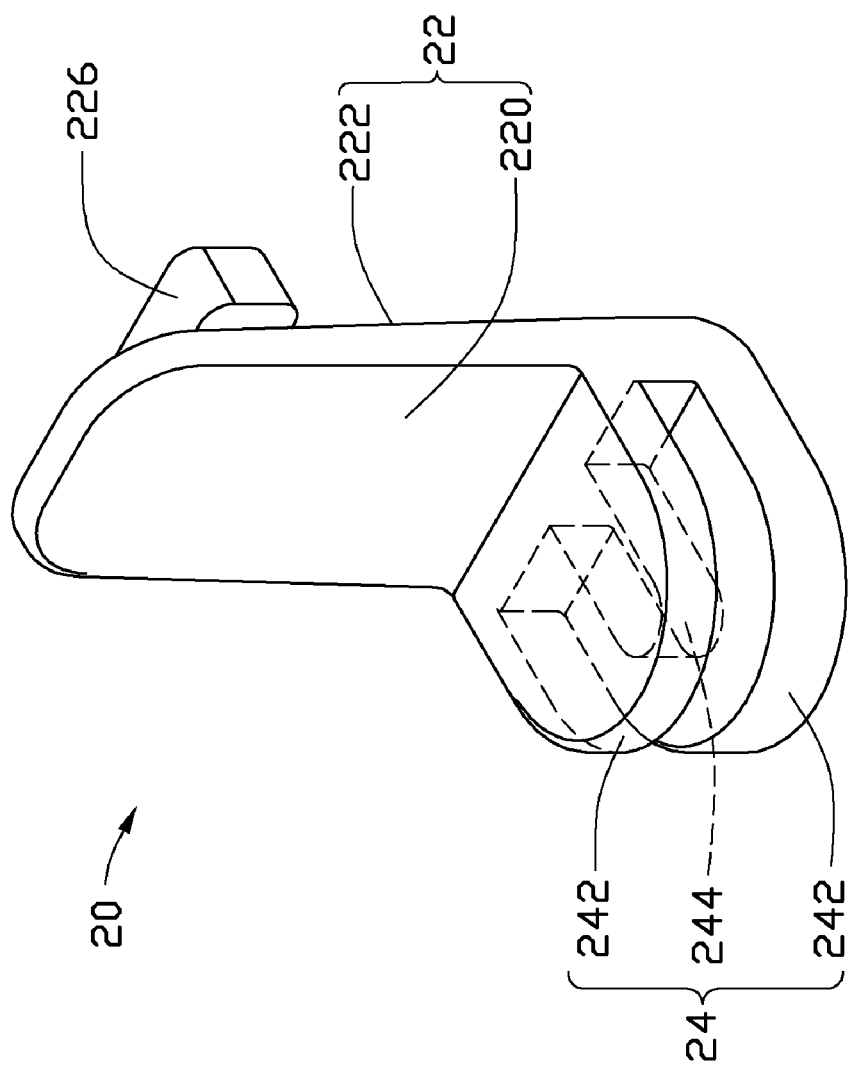
FIG. 3 is an enlarged view of one of the plurality of rubber pads of FIG. 1.
Figure 4:
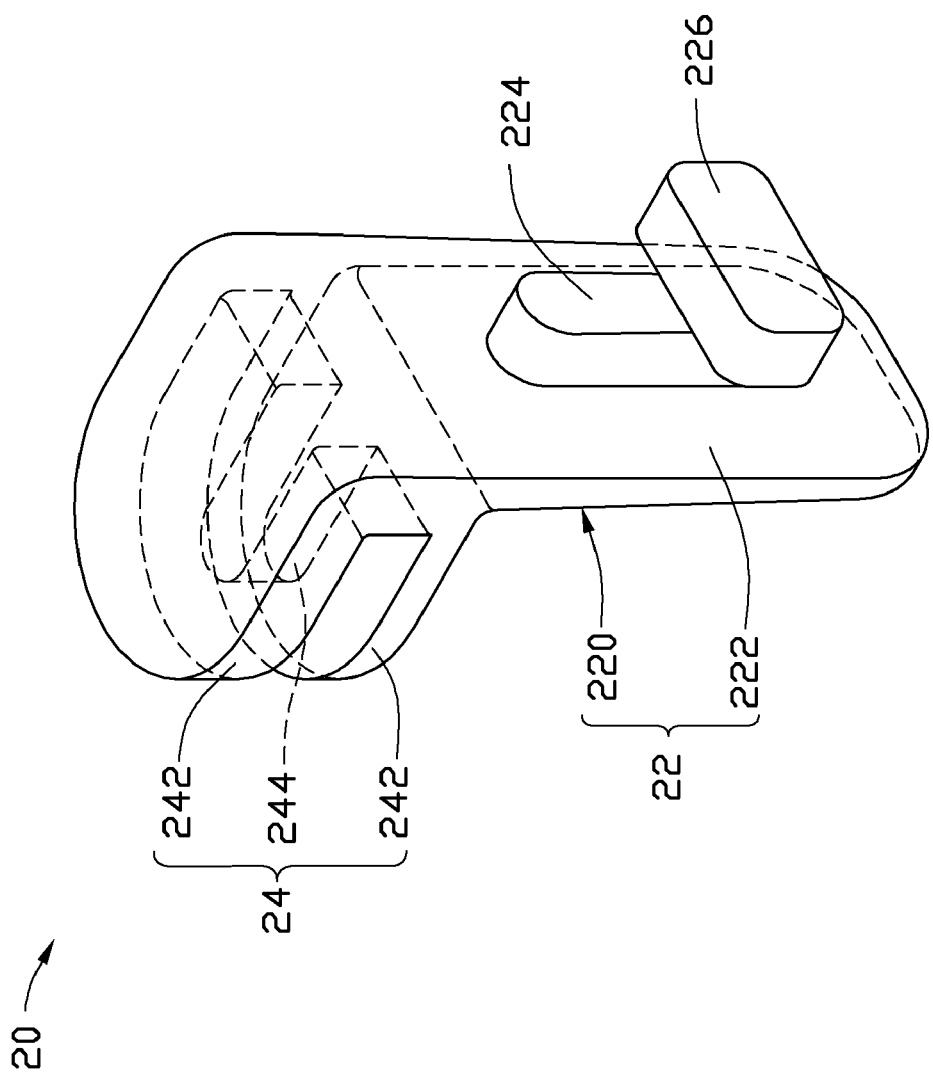
FIG. 4 is an inverted view of the rubber pad of FIG. 3.

Referring to FIGS. 3 and 4, each rubber pad 20 includes a resisting portion 22 and a generally U-shaped clamping portion 24. The resisting portion 22 includes a first side 220, and a second side 222 opposite to the first side 220. The clamping portion 24 perpendicularly extends from a lower portion of the first side 220. The clamping portion 24 includes two clamping walls 242 parallel with and opposite to each other. A block 244 is formed between the clamping walls 242 perpendicular to the first side 220. A fixing protrusion 224 protrudes from a center of the second side 222. A resisting block 226 extends from an upper end of the fixing protrusion 224, and the resisting block 226 is longer than the fixing protrusion 224.

In another embodiment, the block 244 and the resisting block 226 can be omitted.

Figure 5:
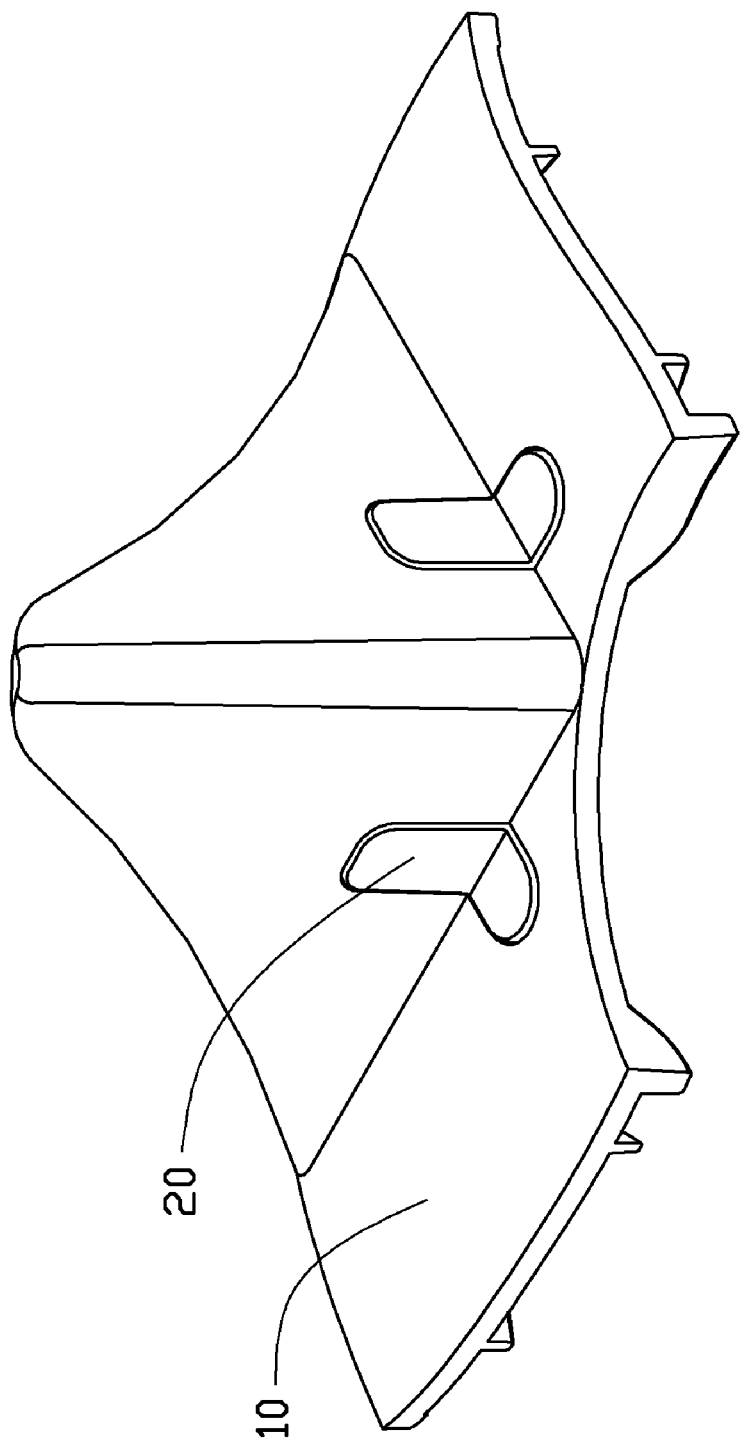
FIG. 5 is an assembled, isometric view of the chassis of FIG. 1.
Figure 6:
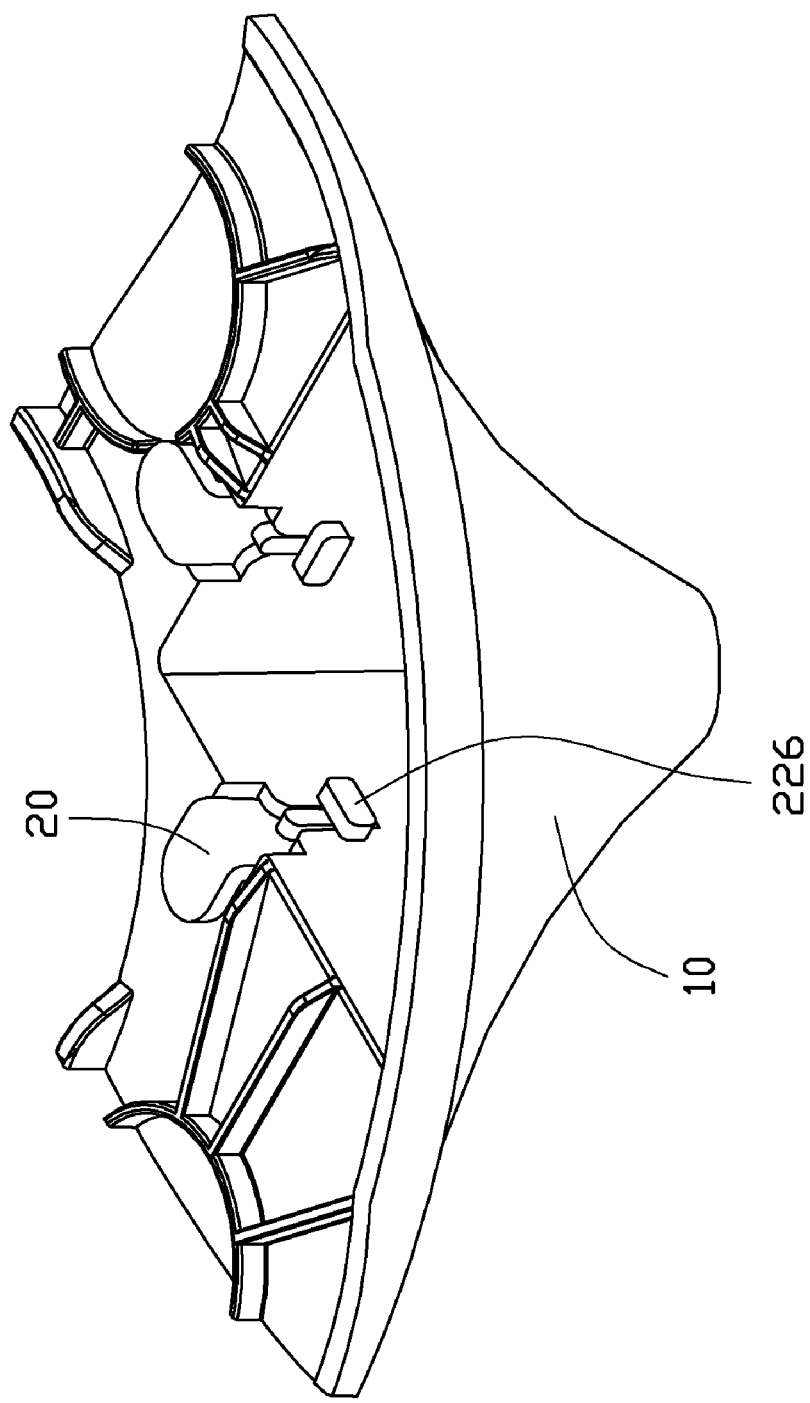
FIG. 6 is an inverted view of the chassis of FIG. 5.

Referring to FIGS. 5 and 6, to assemble each rubber pad 20 to the base body 10, the resisting portion 22 of each rubber pad 20 is inserted into the corresponding through hole 15 of the base body 10, with the second side 222 of the resisting portion 22 abutting the first groove 16 of the base body. In this process, the fixing protrusion 224 of the resisting portion 22 is engaged and slid in the locking slot 18 of the base body 10. The resisting block 226 of the resisting portion 22 resists a side of the side plate 14 of the base body 10, opposite to the first groove 16, which prevents the resisting portion 22 from disengaging from the base body 10. The clamping portion 24 of each rubber pad 20 is urged into the corresponding through hole 15, and then the clamping walls 242 of the clamping portion 24 clamps the second groove 17 of the base body 10 therebetween, with the block 244 of the clamping portion 24 engaging and sliding in the through slot 19 of the base body 10. Therefore, the rubber pad 20 is fixedly mounted to the base body 10.

To detach each rubber pad 20, the clamping portion 24 of each rubber pad 20 is urged to disengage from the corresponding through hole 15 of the base body 10. The clamping portion 24 is moved away from the base body 10 to disengage the rubber pad 20 from the base body 10.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A chassis comprising:
   a base body comprising a bottom plate and a side plate perpendicular to the bottom plate, a junction portion of the bottom plate and the side plate defining a mounting portion, wherein the mounting portion comprises a through hole situated in the junction portion of the bottom plate and the side plate, a locking slot is defined in the side plate and communicates with the through hole; and
   a rubber pad formed with one-piece construction, and comprising a resisting portion and a clamping portion perpendicularly extending from the resisting portion, wherein a fixing protrusion extends from the resisting portion, opposite to the clamping portion, the clamping portion comprises two clamping walls, when the rubber pad is detachably received in the mounting portion, the resisting portion is inserted into the through hole, and the fixing protrusion is engaged and slidable in the locking slot, the clamping portion is received in the through hole, and the bottom plate is clamped between the clamping walls.

2. The chassis of claim 1, wherein the bottom plate defines a through slot communicating with the through hole, and perpendicular to the locking slot, a block is formed from the clamping portion between the clamping walls, to engage in the through slot.

3. The chassis of claim 1, wherein the mounting portion further comprises a first groove defined in a side of the side plate facing the bottom plate, the first groove is aligned with the through hole, and the locking slot is defined in the first groove.

4. The chassis of claim 3, wherein the resisting portion is detachably received in the groove and comprises a first side abutting the first groove, the fixing protrusion extends from the first side and is extended through the locking slot, and a resisting block protrudes from the fixing protrusion to resist an opposite side of the side plate, opposite to the first groove.

5. The chassis of claim 2, wherein the mounting portion further comprises a second groove defined in a side of the bottom plate facing the side plate, the second groove is aligned with the through hole, and the through slot is defined in the second groove, one of the clamping walls facing the side plate is detachably received in the second groove.

* * * * *